UNITED STATES PATENT OFFICE.

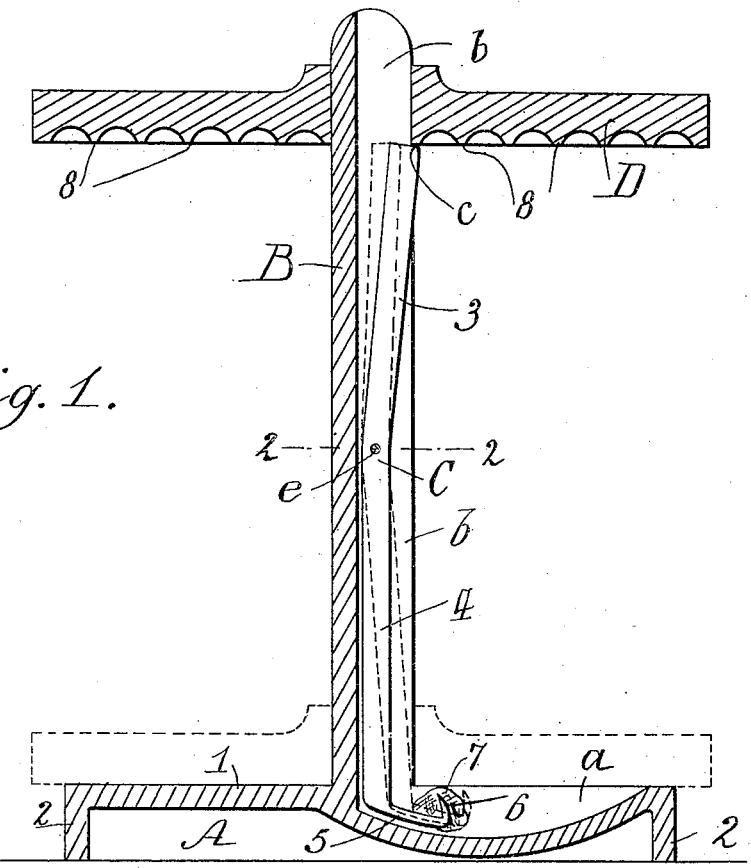
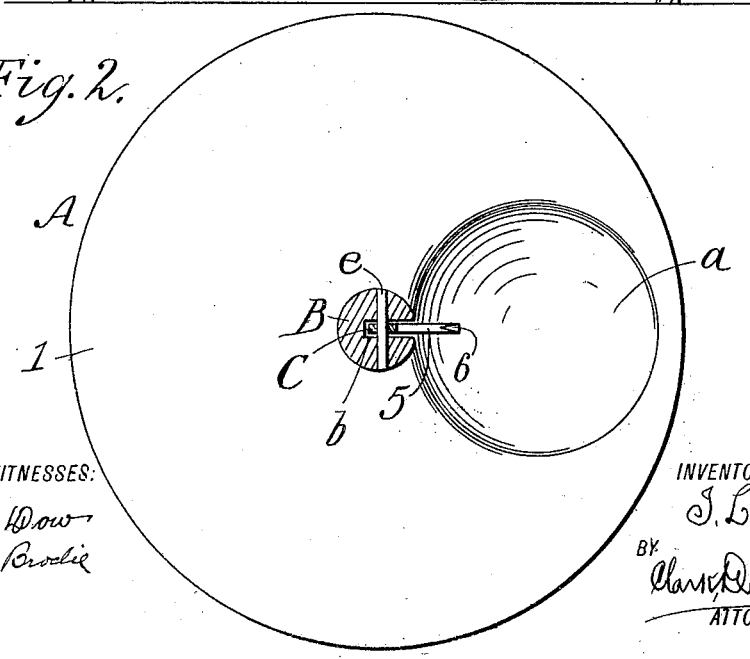

ISAAC LAWRENCE, OF BROOKLYN, NEW YORK.

ANIMAL-TRAP.

No. 920,765.  Specification of Letters Patent.  Patented May 4, 1909.

Application filed November 5, 1908. Serial No. 461,126.

*To all whom it may concern:*

Be it known that I, ISAAC LAWRENCE, a citizen of the United States, and resident of Brooklyn, county of Kings, and State of New York, have invented certain new and useful Improvements in Animal-Traps, of which the following is a specification, reference being had to the accompanying drawing, forming a part thereof, in which similar characters of reference indicate corresponding parts.

This invention relates to animal traps of the class especially employed for trapping and killing small animals, such as rats and mice; the object of the invention being to provide a device of this character which is durable, inexpensive, simple in construction and efficient in operation, and which is susceptible of being readily cleansed and constantly maintained in perfectly sanitary condition.

A further object of the invention is to provide a device of the character named which is adaptable for trapping and destroying animals in a humane manner, the trap being so constructed as to simultaneously trap and instantly kill the animal.

The invention will be hereinafter fully described and specifically set forth in the annexed claims.

In the accompanying drawings forming part of the specification Figure 1, is a vertical sectional elevation of my improved trap; and Fig. 2, is a sectional plan view taken on the line 2—2, of Fig. 1.

In the example of my invention illustrated in the accompanying drawings, I employ primarily a metallic base A, which is of circular contour and embodies the flat disk 1, and annular flange 2. Extended upwardly and centrally from the said base is a spindle B, which is provided throughout its entire length with a slot $b$, which communicates with a concavity $a$, formed in the upper surface of the base A.

Pivotally mounted within the slot $b$, of the spindle B, by means of the pin $e$, is a trip-lever C, embodying the divergent members 3, 4 and the laterally extended arm 5, having the spur 6, for engagement with a piece of bait, as 7; the said arm 5, extending from the slot $b$, of the spindle B, into the concavity $a$, of the base A.

Slidably mounted on the spindle B, is a drop-weight D, which is composed of metal and is of circular contour, and is provided upon its under surface with a series of annular ribs 8; the diameter of the said weight being slightly larger than the diameter of the base A, whereby the animal may be effectually caught between the two said parts, as will be hereinafter fully described.

The trip-lever C, is so proportioned that it is normally maintained, by gravity, in position having the upper end of the member 3 slightly extended outwardly from the slot $b$, of the spindle B, and beyond the diameter of said spindle, thus providing a movable shoulder $c$, upon which the weight D, is normally supported.

All parts of my improved trap are composed of metal, thus the blood of a killed animal cannot be absorbed by any portion of the device and the same may be readily cleansed and constantly maintained in perfectly sanitary condition.

In the operation and use of my invention, a piece of suitable bait 7, such as cheese, meat, etc., is placed upon the spur 6, and the drop-weight D, is placed in position shown by full lines Fig. 1, of the drawings, the same being supported on the shoulder $c$, of the lever C, and maintained in position thereon by gravity, the trap being thus set and ready for use. Then an animal attracted by the bait, will in its efforts to secure said bait, descend into the concavity $a$, and pull the member 4, of the trip-lever C, forwardly throwing the member 3 rearwardly, and thus placing said lever in position shown by dotted lines Fig. 1, of the drawings, with its shoulder $c$, within the slot $b$, whereby the drop-weight D, is caused to rapidly descend upon the animal by force of gravity and the blow thus delivered breaks the animal's spinal column and therefore instantly kills it, the body being retained clamped between the parts A and D, until it is removed for the purpose of resetting the trap. The said operation may be repeated for an indefinite number of times, the device owing to its composition and simplicity of construction being practically indestructible.

I do not confine myself to the specific details of construction as herein shown and described, as it is obvious that under the scope of my invention I am entitled to slight structural variations.

Having thus described my invention, what

I claim as new, and desire to secure by Letters Patent, is:

In an animal trap, the combination, with a fixed base having a concavity therein and a vertically slotted spindle extended upwardly therefrom, and a drop-weight slidably mounted on said spindle, and a trip-lever pivoted in the said slotted spindle, said trip-lever embodying two divergent arms, the upper one having its free end normally extended outwardly from the slot of the spindle, and the lower one having a lateral extension with a spur thereon for receiving bait, said extension located within the said concavity, substantially as shown and described.

In testimony that, I claim the foregoing as my invention, I have signed my name in presence of two witnesses, this 21st day of October 1908.

ISAAC LAWRENCE.

Witnesses:
 CARL M. BERGER,
 THOMAS JEFFERSON DREHER.